US006733893B2

(12) United States Patent
Suzuki et al.

(10) Patent No.: US 6,733,893 B2
(45) Date of Patent: May 11, 2004

(54) COATED SILICONE RUBBER ARTICLE AND METHOD OF PREPARING SAME

(75) Inventors: Toshio Suzuki, Midland, MI (US); Simon Toth, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 47 days.

(21) Appl. No.: 10/211,446

(22) Filed: Aug. 2, 2002

(65) Prior Publication Data

US 2004/0023042 A1 Feb. 5, 2004

(51) Int. Cl.$^7$ ............... B32B 27/32; B32B 9/04; B05D 3/02; B05D 1/02; B05D 1/28
(52) U.S. Cl. ............ 428/447; 428/341; 428/521; 427/535; 427/393.5; 427/421; 427/429; 427/430.1
(58) Field of Search ............... 427/536, 299, 427/301, 302, 307, 322, 457, 496, 498, 508, 512, 521, 372.2, 384, 385.5, 393.5, 398.4, 421, 428, 429, 430.1, 532, 533, 534, 535; 428/446, 447, 500, 521, 341

(56) References Cited

U.S. PATENT DOCUMENTS

| 3,991,239 | A | * | 11/1976 | Anderson | 427/400 |
|---|---|---|---|---|---|
| 4,395,462 | A | * | 7/1983 | Polmanteer | 428/420 |
| 4,808,664 | A | * | 2/1989 | Saam | 525/106 |
| 5,024,863 | A | | 6/1991 | Gibbon | 427/387 |
| 5,962,127 | A | | 10/1999 | Maxson | 428/332 |
| 6,074,703 | A | | 6/2000 | Eckberg et al. | 427/387 |
| 6,433,481 | B1 | * | 8/2002 | Marutsuka | 313/634 |

FOREIGN PATENT DOCUMENTS

| EP | 624 464 B1 | 8/1997 |
|---|---|---|
| EP | 764 681 B1 | 7/1999 |
| JP | 2001-026748 | 1/2001 |

OTHER PUBLICATIONS

Dow corning 93–104 Product Information/MSDS, provided by Dow Corning Web Site; May 1998; Ref. No. 10–1059A–01.*

* cited by examiner

*Primary Examiner*—Philip Tucker
*Assistant Examiner*—Michael Feely
(74) *Attorney, Agent, or Firm*—Larry A. Milen; Jim L. DeCesare

(57) ABSTRACT

A coated silicone rubber article comprising a silicone rubber substrate having a cured polyisobutylene coating on a surface thereof; and a method of preparing a coated silicone rubber article, comprising the steps of (a) applying a curable polyisobutylene composition to a surface of a silicone rubber substrate; and (b) curing the polyisobutylene composition.

20 Claims, No Drawings

COATED SILICONE RUBBER ARTICLE AND METHOD OF PREPARING SAME

FIELD OF THE INVENTION

The present invention relates to a coated silicone rubber article and more particularly to a coated silicone rubber article comprising a silicone rubber substrate having a cured polyisobutylene coating on a surface thereof. The present invention also relates to a method of preparing the article.

BACKGROUND OF THE INVENTION

Silicone rubber is useful in a variety of applications by virtue of its unique combination of properties, including high thermal stability, good water resistance, excellent flexibility, high durability, and good adhesion to various substrates. For example, silicone rubber is widely used in the automotive, electronic, construction, appliance, and aerospace industries. However, silicone rubber also exhibits high permeability to gases, water vapor, and hydrocarbons compared to organic rubber, e.g., butyl rubber. Although this property can be beneficial in certain applications, such as gas-separation membranes, high permeability is undesirable in applications where gas and/or liquid retention is important. Organic solvents can diffuse into silicone rubber causing swelling, significantly decreasing the physical properties of the material.

One approach to reducing the permeability of silicone rubber features coating the surface of the rubber with a less permeable material. Coated silicone rubber articles and methods for their preparation are well known in the art. For example, U.S. Pat. No. 4,395,462 to Polmanteer discloses an article of manufacture comprising a silicone rubber substrate having a cured coating on at least one surface thereof, said coating being cohesively bonded to the substrate and comprising in the uncured state (a) a peroxide-curable fluoroelastomer gum wherein the repeating units are derived from the polymerization of at least one fluorine-containing ethylenically unsaturated organic compound, (b) an amount of an organic peroxide sufficient to achieve curing of said fluoroelastomer gum and (c) an amount of an epoxide compound sufficient to react with the acidic by-products evolved during curing of said gum.

U.S. Pat. No. 6,074,703 to Eckberg et al. discloses a method for reducing oil permeability, comprising the steps of (a) applying a curable fluorosilicone coating to a substrate; and (b) curing the fluorosilicone coating on the substrate, wherein the fluorosilicone coating comprises a vinyl containing fluorosilicone, hydrogen-containing siloxane, and a catalytic amount of a platinum group hydrosilylation catalyst.

U.S. Pat. No. 5,024,863 to Gibbon discloses a method for manufacturing an engine gasket for a vehicle engine having reduced oil permeability, the method comprising the steps of first, forming the engine gasket in the desired shape from a silicone rubber compound, the engine gasket having an inner surface exposed to hot engine oil and an outer surface; and next, applying a silicone varnish coating to at least the inner surface of the engine gasket after the gasket is formed, whereby the inner surface is substantially coated by the silicone varnish coating.

European Patent Application No. EP 0 764 681 B1 to Walker et al. discloses an engine gasket having reduced oil permeability and resistance to bleed, comprising a heat cured silicone rubber compound having a coating of a material selected from the group consisting of parylene N, parylene C, parylene D and mixtures thereof.

European Patent Application No. EP 0624 464 B1 to Lee et al. discloses a multi-layer composite film comprising a core layer of very low gas transmission material, two intermediate layers sandwiching the core layer and two outer layers sandwiching the two intermediate layers. The core layer contains an $O_2$ of $CO_2$ barrier material such as polyvinyl alcohol. The intermediate layers are a protective plastic material such as a polyolefin. The outer layers are a silicone resin derived from a silane solution.

U.S. Pat. No. 5,962,127 to Maxson discloses a silicone gel product comprising (A) a silicone gel selected from the group consisting of organosilicone and halogenated organosilicone gels, wherein the gel has tacky surface and (B) a fluorocarbon elastomer film adhering to the surface of the silicone gel.

Japanese Patent Application No. JP 2001026748 A discloses a silicone rubber member comprising a surface protective layer consisting of overcoat material comprising a urethane resin, formed on the silicone rubber base material.

Although the aforementioned references disclose coated silicone rubber articles having a range of permeabilities, there remains a need for a coated silicone rubber article having superior resistance to gases and liquids.

SUMMARY OF THE INVENTION

The present invention is directed to a coated silicone rubber article comprising a silicone rubber substrate having a cured polyisobutylene coating on a surface thereof.

The present invention is also directed to a method of preparing a coated silicone rubber article, comprising the steps of:

(a) applying a curable polyisobutylene composition to a surface of a silicone rubber substrate; and (b) curing the polyisobutylene composition.

The coated silicone rubber article of the present invention exhibits reduced permeability to liquids and gases compared with the same article absent the cured polyisobutylene coating. For example, the cumulative permeation for 2-propanol through the coated article is typically not more than 10% of the cumulative permeation through the uncoated silicone rubber substrate. Moreover, the desirable physical properties of the silicone rubber, such as thermal stability, flexibility, and durability, are maintained in the coated article.

The method of the present invention employs conventional coating techniques and equipment. Furthermore, the method uses readily available silicone and polyisobutylene compositions. Also, the polyisobutylene composition effectively wets the surface of the silicone rubber substrate, thus facilitating the coating process.

The coated silicone rubber article of the present invention has numerous uses, including gaskets, o-rings, adhesives, insulators, encapsulants, and containers.

These and other features, aspects, and advantages of the present invention will become better understood with reference to the following description and appended claims.

DETAILED DESCRIPTION OF THE INVENTION

A coated silicone rubber article according to the present invention comprises a silicone rubber substrate having a cured polyisobutylene coating on a surface thereof. The silicone rubber substrate can comprise any silicone rubber, filled or unfilled, known in the art. Moreover, the silicone rubber substrate can have any desired shape. As used herein, the term "silicone rubber" refers to a product prepared by curing (vulcanizing or cross-linking) an organopolysiloxane polymer. The mechanical and chemical properties of the silicone rubber substrate depend on the type of polymer, nature and amount of other components in the formulation, processing technique, and method of cure. For example, the silicone rubber substrate can have a hardness of from 5 to 90 Shore A and a consistency ranging from a soft gel to a tough elastomer.

The silicone rubber substrate can be prepared by converting a curable silicone composition into a desired shape by conventional methods, such as compression molding, injection molding, extrusion, and calendaring; and then curing the composition. As used herein, the term "curing" means the conversion of a liquid or semisolid composition to a cross-linked product. Examples of curable silicone compositions include, but are not limited to, hydrosilylation-curable silicone compositions, peroxide curable silicone compositions, condensation-curable silicone compositions, epoxy-curable silicone compositions; ultraviolet radiation-curable silicone compositions, and high-energy radiation-curable silicone compositions.

Curable silicone compositions and methods for their preparation are well known in the art. For example, a suitable hydrosilylation-curable silicone composition typically comprises (i) an organopolysiloxane containing an average of at least two silicon-bonded alkenyl groups per molecule, (ii) an organohydrogensiloxane containing an average of at least two silicon-bonded hydrogen atoms per molecule in an amount sufficient to cure the composition, and (iii) a hydrosilylation catalyst. The hydrosilylation catalyst can be any of the well known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions.

The hydrosilylation-curable silicone composition can be a one-part composition or a multi-part composition comprising the components in two or more parts. Room-temperature vulcanizable (RTV) compositions typically comprise two parts, one part containing the organopolysiloxane and catalyst and another part containing the organohydrogensiloxane and any optional ingredients. Hydrosilylation-curable silicone compositions that cure at elevated temperatures can be formulated as one-part or multi-part compositions. For example, liquid silicone rubber (LSR) compositions are typically formulated as two-part systems. One-part compositions typically contain a platinum catalyst inhibitor to ensure adequate shelf life.

A suitable peroxide-curable silicone composition typically comprises (i) an organopolysiloxane and (ii) an organic peroxide. Examples of organic peroxides include, diaroyl peroxides such as dibenzoyl peroxide, di-p-chlorobenzoyl peroxide, and bis-2,4-dichlorobenzoyl peroxide; dialkyl peroxides such as di-t-butyl peroxide and 2,5-dimethyl-2,5-di-(t-butylperoxy)hexane; diaralkyl peroxides such as dicumyl peroxide; alkyl aralkyl peroxides such as t-butyl cumyl peroxide and 1,4-bis(t-butylperoxyisopropyl)benzene; and alkyl aroyl peroxides such as t-butyl perbenzoate, t-butyl peracetate, and t-butyl peroctoate.

A condensation-curable silicone composition typically comprises (i) an organopolysiloxane containing an average of at least two hydroxy groups per molecule; and (ii) a tri- or tetra-functional silane containing hydrolysable Si—O or Si—N bonds. Examples of silanes include alkoxysilanes such as $CH_3Si(OCH_3)_3$, $CH_3Si(OCH_2CH_3)_3$, $CH_3Si(OCH_2CH_2CH_3)_3$, $CH_3Si[O(CH_2)_3CH_3]_3$, $CH_3CH_2Si(OCH_2CH_3)_3$, $C_6H_5Si(OCH_3)_3$, $C_6H_5CH_2Si(OCH_3)_3$, $C_6H_5Si(OCH_2CH_3)_3$, $CH_2=CHSi(OCH_3)_3$, $CH_2=CHCH_2Si(OCH_3)_3$, $CF_3CH_2CH_2Si(OCH_3)_3$, $CH_3Si(OCH_2CH_2OCH_3)_3$, $CF_3CH_2CH_2Si(OCH_2CH_2OCH_3)_3$, $CH_2=CHSi(OCH_2CH_2OCH_3)_3$, $CH_2=CHCH_2Si(OCH_2CH_2OCH_3)_3$, $C_6H_5Si(OCH_2CH_2OCH_3)_3$, $Si(OCH_3)_4$, $Si(OC_2H_5)_4$, and $Si(OC_3H_7)_4$; organoacetoxysilanes such as $CH_3Si(OCOCH_3)_3$, $CH_3CH_2Si(OCOCH_3)_3$, and $CH_2=CHSi(OCOCH_3)_3$; organoiminooxysilanes such as $CH_3Si[O—N=C(CH_3)CH_2CH_3]_3$, $Si[O—N=C(CH_3)CH_2CH_3]_4$, and $CH_2=CHSi[O—N=C(CH_3)CH_2CH_3]_3$; organoacetamidosilanes such as $CH_3Si[NHC(=O)CH_3]_3$ and $C_6H_5Si[NHC(=O)CH_3]_3$; aminosilanes such as $CH_3Si[NH(s-C_4H_9)]_3$ and $CH_3Si(NHC_6H_{11})_3$; and organoaminooxysilanes.

A condensation-curable silicone composition can also contain a condensation catalyst to initiate and accelerate the condensation reaction. Examples of condensation catalysts include, but are not limited to, amines; and complexes of lead, tin, zinc, and iron with carboxylic acids. Tin(II) octoates, laurates, and oleates, as well as the salts of dibutyl tin, are particularly useful. The condensation-curable silicone composition can be a one-part composition or a multi-part composition comprising the components in two or more parts. For example, room-temperature vulcanizable (RTV) compositions can be formulated as one-part or two-part compositions. In the two-part composition, one of the parts typically includes a small amount of water.

A suitable epoxy-curable silicone composition typically comprises (i) an organopolysiloxane containing an average of at least two epoxy-functional groups per molecule and (ii) a curing agent. Examples of epoxy-functional groups include 2-glycidoxyethyl, 3-glycidoxypropyl, 4-glycidoxybutyl, 2,(3,4-epoxycyclohexyl)ethyl, 3-(3,4-epoxycyclohexyl)propyl, 2,3-epoxypropyl, 3,4-epoxybutyl, and 4,5-epoxypentyl. Examples of curing agents include anhydrides such as phthalic anhydride, hexahydrophthalic anhydride, tetrahydrophthalic anhydride, and dodecenylsuccinic anhydride; polyamines such as diethylenetriamine, triethylenetetramine, diethylenepropylamine, N-(2-hydroxyethyl)diethylenetriamine, N,N'-di(2-hydroxyethyl) diethylenetriamine, m-phenylenediamine, methylenedianiline, aminoethyl piperazine, 4,4-diaminodiphenyl sulfone, benzyldimethylamine, dicyandiamide, and 2-methylimidazole, and triethylamine; Lewis acids such as boron trifluoride monoethylamine; polycarboxylic acids; polymercaptans; polyamides; and amidoamines.

A suitable ultraviolet radiation-curable silicone composition typically comprises (i) an organopolysiloxane containing radiation-sensitive functional groups and (ii) a photoinitiator. Examples of radiation-sensitive functional groups include acryloyl, methacryloyl, mercapto, epoxy, and alkenyl ether groups. The type of photoinitiator depends on the nature of the radiation-sensitive groups in the organopolysiloxane. Examples of photoinitiators include diaryliodonium salts, sulfonium salts, acetophenone, benzophenone, and benzoin and its derivatives.

A suitable high-energy radiation-curable silicone composition comprises an organopolysiloxane polymer. Examples of organpolyosiloxane polymers include polydimethylsiloxanes, poly(methylvinylsiloxanes), and organohydrogenpolysiloxanes. Examples of high-energy radiation include γ-rays and electron beams.

The curable silicone composition of the present invention can comprise additional ingredients, provided the ingredient does not adversely affect the permeability properties of the coated article, as described above. Examples of additional ingredients include, but are not limited to, adhesion promoters, solvents, inorganic fillers, photosensitizers, antioxidants, stabilizers, pigments, and surfactants. Examples of inorganic fillers include, but are not limited to, natural silicas such as crystalline silica, ground crystalline silica, and diatomaceous silica; synthetic silicas such as fused silica, silica gel, pyrogenic silica, and precipitated silica; silicates such as mica, wollastonite, feldspar, and nepheline syenite; metal oxides such as aluminum oxide, titanium dioxide, magnesium oxide, ferric oxide, beryllium oxide, chromium oxide, and zinc oxide; metal nitrides such as boron nitride, silicon nitride, and aluminum nitride, metal carbides such as boron carbide, titanium carbide, and silicon carbide; carbon black; alkaline earth metal carbonates such as calcium carbonate; alkaline earth metal sulfates such as calcium sulfate, magnesium sulfate, and barium sulfate; molybdenum disulfate; zinc sulfate; kaolin; talc; glass fiber; glass beads such as hollow glass microspheres and solid glass microspheres; aluminum trihydrate; asbestos; and metallic powders such as aluminum, copper, nickel, iron, and silver powders.

The silicone composition can be cured by exposure to ambient temperature, elevated temperature, moisture, or radiation, depending on the particular cure mechanism. For example, one-part hydrosilylation-curable silicone compositions are typically cured at an elevated temperature. Two-part hydrosilylation-curable silicone compositions are typically cured at room temperature or an elevated temperature. One-part condensation-curable silicone compositions are typically cured by exposure to atmospheric moisture at room temperature, although cure can be accelerated by application of heat and/or exposure to high humidity. Two-part condensation-curable silicone compositions are typically cured at room temperature; however, cure can be accelerated by application of heat. Peroxide-curable silicone compositions are typically cured at an elevated temperature. Epoxy-curable silicone compositions are typically cured at room temperature or an elevated temperature. Depending on the particular formulation, radiation-curable silicone compositions are typically cured by exposure to radiation, for example, ultraviolet light, gamma rays, or electron beams.

The cured polyisobutylene coating is a cured product of a curable polyisobutylene composition. The polyisobutylene coating typically has a thickness not more than 25%, alternatively not more than 15%, alternatively not more than 10%, of the maximum thickness of the silicone rubber substrate. When the thickness of the cured polyisobutylene coating is greater than 25%, of the maximum thickness of the silicone rubber substrate, air may become entrapped in the coating during curing. The cured polyisobutylene coatings can be prepared according to the method of the present invention, described below.

A method of preparing a coated article according to the present invention, comprises the steps of:

(a) applying a curable polyisobutylene composition to a surface of a silicone rubber substrate; and (b) curing the polyisobutylene composition.

A curable polyisobutylene composition is applied to a surface of a silicone rubber substrate. The curable polyisobutylene composition of the present invention comprises a polyisobutylene polymer containing an average of at least two functional groups per molecule capable of reacting to cross-link (cure) the polymer; and a curing agent, for example, a catalyst or photoinitiator. As used herein, the term "polyisobutylene polymer" refers to an oligomer, homopolymer, or copolymer containing monomeric units derived from isobutylene and having the formula —$CH_2C(CH_3)_2$—. The polyisobutylene polymer typically contains an average of at least 50 mol %, alternatively at least 80 mol %, alternatively at least 95 mol %, of these monomeric units per molecule. Monomeric units other than —$CH_2C(CH_3)_2$— units can be derived from olefin monomers. The olefin monomers typically contain from 2 to 20 carbon atoms, alternatively from 4 to 10 carbon atoms. Examples of olefin monomers include, but are not limited to, alkenes such as 1-butene, 2-butene, 2-methyl-1-butene, 3-methyl-1-butene, 1-pentene, 4-methyl-1-pentene, 1-hexene, and vinyl-cyclohexane; alkadienes such as butadiene and isoprene; alkenyl ethers such as methyl vinyl ether, ethyl vinyl ether, and isobutyl vinyl ether; cycloalkenes such as cylcohexene and β-pinene; cycloalkadienes such as cyclopentadiene; and aromatic compounds containing aliphatic carbon—carbon double bonds such as styrene, α-methylstyrene, dimethylstyrene, monochlorostyrene, dichlorostyrene, and indene.

The functional groups in the polyisobutylene polymer can be located at pendant, terminal, or both pendant and terminal positions in the molecules. Examples of functional groups include, but are not limited to, alkenyl, silicon-bonded hydrolysable groups, epoxy, alkenyl ether groups, acryloyl, and methacryloyl.

The polyisobutylene polymer typically has a number average molecular weight of from 1,000 to 1,000,000, alternatively from 3,000 to 100,000, as determined by GPC employing a low angle laser light scattering detector.

The type of curing agent depends on the nature of the functional groups in the polyisobutylene (PIB) polymer. For example, when the PIB polymer contains alkenyl groups, the curing agent typically comprises an organosilicon compound containing silicon-bonded hydrogen atoms and a hydrosilylation catalyst. When the PIB polymer contains silicon-bonded hydrolysable groups, the curing agent is typically a condensation catalyst. When the PIB polymer contains epoxy groups, the curing agent is typically an amine or acid anhydride. When the PIB polymer contains alkenyl ether, acryloyl or methacryloyl groups, the curing agent is typically a photoinitiator.

Examples of curable polyisobutylene compositions include, but are not limited to, hydrosilylation-curable polyisobutylene compositions, condensation-curable polyisobutylene compositions, epoxy-curable polyisobutylene compositions, and radiation-curable polyisobutylene compositions.

Curable polyisobutylene compositions and methods for their preparation are well known in the art. For example, a suitable hydrosilylation-curable polyisobutylene composition typically comprises (i) a polyisobutylene polymer containing alkenyl groups; (ii) an organosilicon compound containing silicon-bonded hydrogen atoms; and (iii) a hydrosilylation catalyst. Examples of alkenyl groups include, but are not limited to, vinyl, allyl, butenyl, and hexenyl. Examples of organosilicon compounds containing silicon-bonded hydrogen atoms include organohydrogensilanes and organohydrogensiloxanes. The hydrosilylation catalyst can be any of the well-known hydrosilylation catalysts or microencapsulated hydrosilylation catalysts comprising a platinum group metal. Platinum-containing catalysts, for example, a platinum(0) complex of 1,3-divinyl-1,1,3,3-tetramethyldisiloxane, are particularly useful due to their high activity in hydrosilylation reactions. Methods of preparing polyisobutylene polymers containing alkenyl groups and curable compositions comprising such polymers are well known in the art, as exemplified in EP 0 709 403 A1 to Sakaguchi et al.; U.S. Pat. No. 5,728,768 to Saxena et al.; U.S. Pat. No. 5,753,743 to Saxena et al.; U.S. Pat. No. 6,077,892 to Feng et al.; U.S. Pat. No. 6,043,179 to Feng et al.; EP 0 984 036 A2 to Feng et al.; and U.S. Pat. No. 5,952,419 to DeGroot et al.

A suitable condensation-curable polyisobutylene composition typically comprises (i) a polyisobutylene polymer containing silicon-bonded hydrolysable groups and (ii) a condensation catalyst. Examples of hydrolysable groups include alkoxy, phenoxy, acyloxy, amino, amido, aminoxy, mercapto, alkenyloxy, halogen, alkoxyalkoxy, and ketoximo. Examples of condensation catalysts include carboxylates of tin such as dibutyltin diacetate, dibutyltin dilaurate, tin tripropyl acetate, stannous octoate, stannous oxalate, stannous naphthanate, and dibutylbis(2,4-pentanedioate)tin; titanium compounds such as tetrabutyl titanate, titanium diisopropoxy-bis-ethylacetoacetate, and tetraisopropoxy titanate; carboxylates of bismuth; carboxylates of lead; carboxylates of zirconium; amines such as triethylamine, ethylenetriamine, butylamine, octylamine, dibutylamine, monoethanolamine, diethanolamine, triethanolamine, diethylenetriamine, triethylenetetramine, cyclohexylamine, benzylamine, diethylaminopropylamine, xylylenediamine, triethylenediamine, guanidine, diphenylguanidine, and morpholine. Methods of preparing polyisobutylene polymers containing hydrolysable groups and curable compositions containing such polymers are well known in the art, as exemplified in U.S. Pat. No. 4,904,732 to Iwahara et al.; U.S. Pat. No. 4,524,187 to Greco et al.; U.S. Pat. No. 6,380,316 B1 to Bahadur et al.; U.S. Pat. No. 6,258,878 B1 to Bahadur et al.; and U.S. Pat. No. 6,177,519 to Chung et al.

A suitable epoxy-curable polyisobutylene composition typically comprises (i) an epoxy-functional polyisobutylene polymer and (ii) a curing agent. Examples of epoxy groups include epoxyethyl, glycidyl, glycidoxy, 2-glycidoxyethyl, 3-glycidoxypropyl, and 4-glycidoxybutyl. Examples of curing agents include organic amines such as diethylenetriamine, amine-functional silanes, and amine-functional siloxanes. Methods of preparing epoxy-functional polyisobutylene polymers and curable compositions comprising such polymers are well known in the art, as exemplified in U.S. Pat. No. 5,977,255 to Li et al.

A suitable radiation-curable polyisobutylene composition can comprise (i) an alkenyl ether-functional polyisobutylene polymer and (ii) a cationic photoinitiator. Examples of alkenyl ether groups include those having the formulae $-SiR_a^1[OR^2OC(R^3)=CH(R^4)]_{3-a}$ and $-R^2OC(R^3)=CHR^4$ wherein each $R^1$ is independently hydrocarbyl or alkoxy, $R^2$ is a divalent hydrocarbon group having from 2 to 20 carbon atoms, $R^3$ and $R^4$ are independently hydrogen or hydrocarbyl, and a has a value of from 0 to 2. Examples of cationic photoinitiators including onium salts, diaryliodonim salts of sulfonic acids, triarylsulfonium salts of sulfonic acids, diaryliodonium salts of boronic acids, and triarylsulfonium salts of boronic acids. Methods of preparing alkenyl ether-functional polyisobutylene polymers and curable compositions comprising such polymers are well known in the art, as exemplified in U.S. Pat. No. 6,069,185 to Bahadur et al.; U.S. Pat. No. 6,054,549 to Bahadur et al.; U.S. Pat. No. 6,242,058 B1 to Bahadur et al.; and WO 01/88003 A1 to Bahadur et al.

Alternatively, a suitable radiation-curable polyisobutylene composition can comprise (i) an acryloyl- or methacryloyl-functional polyisobutylene polymer and (ii) a photoinitiator. Examples of photoinitiators include 2-hydroxy-2-methyl-1-phenylpropan-1-one, 2,2-dimethoxy-2-phenylcetophenone, acetophenone, benzophenone, benzoin, and benzil or a derivative thereof. Methods of preparing acryloyl- and methacryloyl-functional polyisobutylene polymers and compositions comprising such polymers are well known in the art, as exemplified in example, U.S. Pat. No. 5,665,823 to Saxena et al.

The curable polyisobutylene composition can comprise additional ingredients, provided the ingredient does not adversely affect the permeability properties of the coated article, as described above. Examples of additional ingredients include, but are not limited to, adhesion promoters, solvents, reinforcing and extending fillers, photosensitizers, antioxidants, stabilizers, pigments, plasticizers, and surfactants.

The silicone rubber substrate and methods of preparing the substrate are as described above for the coated article of the present invention. To improve adhesion of the cured polyisobutylene composition to the silicone rubber substrate, the surface of the substrate can be physically or chemically treated before application of the curable polyisobutylene composition. Examples of surface treatments include, but are not limited to, solvent wash, corona discharge, plasma discharge, application of a primer, and physical roughening.

The curable polyisobutylene composition can be applied to the silicone rubber substrate by any conventional method known in the art, such as spin coating, dipping, spraying, brushing, or screen-printing. The coating conditions and viscosity of the curable poloyisobutylene composition can be adjusted so the cured polyisobutylene coating has the desired thickness.

The curable polyisobutylene composition can be cured by exposure to ambient temperature, elevated temperature, moisture, or radiation, depending on the particular cure mechanism. For example, hydrosilylation-curable polyisobutylene compositions are typically cured at room temperature or an elevated temperature. Condensation-curable polyisobutylene compositions are typically cured by exposure to atmospheric moisture at room temperature, although cure can be accelerated by application of heat and/or exposure to high humidity. Epoxy-curable polyisobutylene compositions are typically cured at room temperature or an elevated temperature. Radiation-curable silicone compositions are typically cured by exposure to ultraviolet radiation.

The coated silicone rubber article of the present invention exhibits reduced permeability to liquids and gases compared with the same article absent the cured polyisobutylene coating. For example, the coated silicone rubber article typically has a permeability of not more than 10% of the permeability of the uncoated silicone rubber. Moreover, the desirable physical properties of the silicone rubber, such as thermal stability, flexibility, and durability, are maintained in the coated article.

The method of the present invention employs conventional coating techniques and equipment. Furthermore, the method uses readily available silicone and polyisobutylene compositions. Also, the polyisobutylene composition effectively wets the surface of the silicone rubber substrate, thus facilitating the coating process.

The coated silicone rubber article of the present invention has numerous uses, including gaskets, o-rings, adhesives, insulators, encapsulants, and containers.

These and other features, aspects, and advantages of the present invention will become better understood with refer-

EXAMPLES

The following examples are presented to further illustrate the coated silicone rubber article and method of the present invention, but are not to be considered as limiting the invention, which is delineated in the appended claims. Unless otherwise noted, all parts and percentages reported in the examples are by weight. The following methods and materials were employed in the examples:

Preparation of Silicone Rubber Substrates

Silicone rubber films (102×102×0.38 mm) were prepared by injection molding Dow Corning Silastic® 94-595 Liquid Silicone Rubber at a temperature of 193° C. for about 15 to 20 s. Immediately before use, each film was cleaned by drawing a Kimwipe disposable wiper moistened with hexane over the surface to be coated. Also, as indicated in Table 1, certain samples were Corona treated using a T973-08-92 Corona Discharge Treating System (Corotec Corporation, Farmington, Conn.) operating at a power setting of 65% and a conveyor belt speed of 40%.

Preparation of Coated Silicone Rubber Test Specimens

The curable polyisobutylene composition was drawn over the surface of a silicone rubber substrate with a #10 Mayer-rod. The coated substrate was heated in a Web Dryer/2 Zone Oven (Wisconsin Oven Corporation, East Troy, Wis.) at a temperature of about 149° C. for 30 s.

Measurement of Cumulative Permeation and Permeation Rate

The cumulative permeation and steady-state permeation rate of 2-propanol through the coated silicone rubber test specimen were determined according to Procedure A and Procedure B, respectively, of ASTM F1407-99a. The coated surface of the test specimen faced the isopropyl alcohol in the cup assembly.

The following chemical substances were used in the examples:

Polymer A: an allyl-terminated polyisobutylene polymer sold under the name EPION 400A by Kaneka Corporation (Osaka, Japan). The polymer has a number-average molecular weight of about 10,000.

Polymer B: an allyl-terminated polyisobutylene polymer sold under the name EPION 200A by Kaneka Corporation (Osaka, Japan). The polymer has a number-average molecular weight of about 5,000.

Cross-linking Agent: a trimethylsiloxy-terminated poly(dimethylsiloxane/methylhydrogen-siloxane) having an average of three dimethylsiloxane units and five methylhydrogensiloxane units per molecule and containing about 0.8% of silicon-bonded hydrogen atoms.

Inhibitor: 3,5-dimethyl-1-hexyn-3-ol.

Catalyst: a mixture consisting of 0.38% of 1,3-divinyl-1,1,3,3-tetramethyldisiloxane, 0.62% of platinum complex of 1,3-divinyl-1,1,3,3-tetramethyldisiloxane, and 99% of a hydrogenated polybutene having a number-average molecular weight of about 370. The hydrogenated polybutene is sold under the name Panalene L-14 by Amoco Chemical Company (BP Amaco Chemicals, Lisle, Ill.).

Example 1

A curable polyisobutylene composition was prepared by combining in order 50.00 parts of Polymer A, 2.56 parts of Cross-linking Agent, 0.07 part of Inhibitor, 1.70 parts of Catalyst, and 36.22 parts of n-hexane. After each addition, the components was mixed to homogeneity using a DAC 150 SpeedMixer (Flack Tek Corporation, Landrum, S.C.). Two coated silicone rubber test specimens were prepared as described above. The cumulative permeation and the steady-state permeation rate of 2-propanol through the test specimens are reported in Table 1.

Example 2

A curable polyisobutylene composition was prepared as described in Example 1 using the following components: 50.00 parts of Polymer B, 4.58 parts of Cross-linking Agent, 0.07 part of Inhibitor, 1.76 parts of Catalyst, and 37.61 parts of n-hexane. A coated silicone rubber test specimen was prepared as described above. The cumulative permeation and the steady-state permeation rate of 2-propanol through the test specimen are reported in Table 1.

Example 3

A curable polyisobutylene composition was prepared as described in Example 1 using the following components: 50.00 parts of Polymer B, 3.44 parts of Cross-linking Agent, 0.07 part of Inhibitor, 1.72 parts of Catalyst, and 36.82 parts of n-hexane. A coated silicone rubber test specimen was prepared as described above. The cumulative permeation and the steady-state permeation rate of 2-propanol through the test specimen are reported in Table 1.

Example 4

A curable polyisobutylene composition was prepared as described in Example 1 using the following components: 50.00 parts of Polymer B, 4.58 parts of Cross-linking Agent, 0.07 part of Inhibitor, 1.76 parts of Catalyst, and 37.61 parts of n-hexane. Two coated silicone rubber test specimens were prepared as described above. The cumulative permeation and the steady-state permeation rate of 2-propanol through the test specimens are reported in Table 1.

Example 5

A curable polyisobutylene composition was prepared as described in Example 1 using the following components: 50.00 parts of Polymer B, 6.87 parts of Cross-linking Agent, 0.07 parts of Inhibitor, 1.83 parts of Catalyst, and 39.18 parts of n-hexane. Two coated silicone rubber test specimens were prepared as described above. The cumulative permeation and the steady-state permeation rate of 2-propanol through the test specimens are reported in Table 1.

Comparative Example 1

Two silicone rubber substrates were prepared as described above. The cumulative permeation and the steady-state permeation rate of 2-propanol through the uncoated substrates are reported in Table 1.

TABLE 1

| Example | Sample | Corona treatment | Cumulative Permeation 1 h ($\mu g/cm^2$) | Steady State Permeation ($\mu g/cm^2/min$) |
|---|---|---|---|---|
| 1 | 1 | − | 4317 | 73 |
|   | 2 | + | 2143 | 30 |
| 2 | 1 | + | 492 | 7 |
| 3 | 1 | − | 951 | 14 |
| 4 | 1 | − | 643 | 12.4 |
|   | 2 | + | 492 | 4.5 |
| 5 | 1 | − | 730 | 13.6 |
|   | 2 | + | 1262 | 16 |

TABLE 1-continued

| Example | Sample | Corona treatment | Cumulative Permeation 1 h ($\mu$g/cm$^2$) | Steady State Permeation ($\mu$g/cm$^2$/min) |
|---|---|---|---|---|
| Comp. 1 | 1 | - | 11190 | 189 |
| | 2 | - | 11770 | 190 |

+ Denotes corona treatment of silicone rubber substrate and − denotes absence of corona treatment.

That which is claimed is:

1. A coated silicone rubber article, comprising a corona discharge treated silicone rubber substrate having a cured polyisobutylene coating on a surface thereof.

2. The article according to claim 1, wherein the cured polyisobutylene coating has a thickness not more than 15% of the maximum thickness of the silicone rubber substrate.

3. The article according to claim 1, wherein the silicone rubber substrate is prepared by curing a curable silicone composition selected from a hydrosilylation-curable silicone composition, a peroxide curable silicone composition, a condensation-curable silicone composition, an epoxy-curable silicone composition; an ultraviolet radiation-curable silicone composition, and a high-energy radiation-curable silicone composition.

4. The article according to claim 3, wherein the curable silicone composition further comprises an inorganic filler.

5. The article according to claim 3, wherein the curable silicone composition is selected from a hydrosilylation-curable silicone composition, a peroxide curable silicone composition, and a condensation-curable silicone composition.

6. The article according to claim 5, wherein the curable silicone composition is a peroxide-curable silicone composition comprising an organopolysiloxane and an organic peroxide.

7. The article according to claim 5, wherein the curable silicone composition is a hydrosilylation-curable silicone composition comprising (i) an organopolysiloxane containing an average of at least two silicon-bonded alkenyl groups per molecule, (ii) an organohydrogensiloxane containing an average of at least two silicon-bonded hydrogen atoms per molecule in an amount sufficient to cure the composition, and (iii) a hydrosilylation catalyst.

8. The article according to claim 7, wherein the hydrosilylation-curable silicone composition is a liquid silicone rubber composition.

9. The article according to claim 5, wherein the curable silicone composition is a condensation-curable silicone composition comprising (i) an organopolysiloxane containing an average of at least two hydroxy groups per molecule; and (ii) a tri- or tetra-functional silane containing hydrolysable Si—O or Si—N bonds.

10. The article according to claim 9, wherein the silane contains silicon-bonded alkoxy groups.

11. The article according to claim 9, wherein the condensation-curable silicone composition further comprises a condensation catalyst.

12. A method of preparing a coated silicone rubber article, comprising the steps of:
(a) applying a curable polyisobutylene composition to a surface of a silicone rubber substrate;
(b) treating the surface of the silicone rubber substrate to improve adhesion of the curable polyisobutylene coating to the substrate, the step of treating the surface of the silicone rubber substrate being carried out by exposing the surface to a corona discharge; and
(c) curing the polyisobutylene composition.

13. The method according to claim 12, wherein the polyisobutylene composition comprises a polyisobutylene polymer containing an average of at least two functional groups per molecule capable of reacting to cross-link the polymer.

14. The method according to claim 13, wherein the polyisobutylene polymer contains an average of at least 80 mol % of units having the formula —CH$_2$C(CH$_3$)$_2$— per molecule.

15. The method according to claim 13, wherein the functional groups are selected from alkenyl; silicon-bonded hydrolysable groups, epoxy, alkenyl ether groups, acryloyl, and methacryloyl.

16. The method according to claim 15, wherein the functional groups are selected from alkenyl and silicon-bonded hydrolysable groups.

17. The method according to claim 12, wherein the curable polyisobutylene composition is selected from a hydrosilylation-curable polyisobutylene composition, a condensation-curable polyisobutylene composition, an epoxy-curable polyisobutylene composition, and a radiation-curable polyisobutylene composition.

18. The method according to claim 17, wherein the curable polyisobutylene composition is a hydrosilylation-curable polyisobutylene composition comprising (i) a polyisobutylene polymer containing alkenyl groups, (ii) an organosilicon compound containing silicon-bonded hydrogen atoms, and (iii) a hydrosilylation catalyst.

19. The method according to claim 12, wherein the curable polyisobutylene composition is applied to the silicone rubber substrate by a method selected from dipping, spraying, spin coating, brushing, and screen-printing.

20. The method according to claim 12, wherein the curable polyisobutylene composition is cured by exposing the composition to ambient temperature, elevated temperature, moisture, or radiation.

* * * * *